No. 862,466.

PATENTED AUG. 6, 1907.

R. P. FRIST.
GLASS MOLDING MACHINE.
APPLICATION FILED DEC. 8, 1904.

3 SHEETS—SHEET 1.

WITNESSES:

INVENTOR

BY

ATTORNEY.

No. 862,466. PATENTED AUG. 6, 1907.
R. P. FRIST.
GLASS MOLDING MACHINE.
APPLICATION FILED DEC. 8, 1904.
3 SHEETS—SHEET 2.
FIG. 2.
FIG. 3.
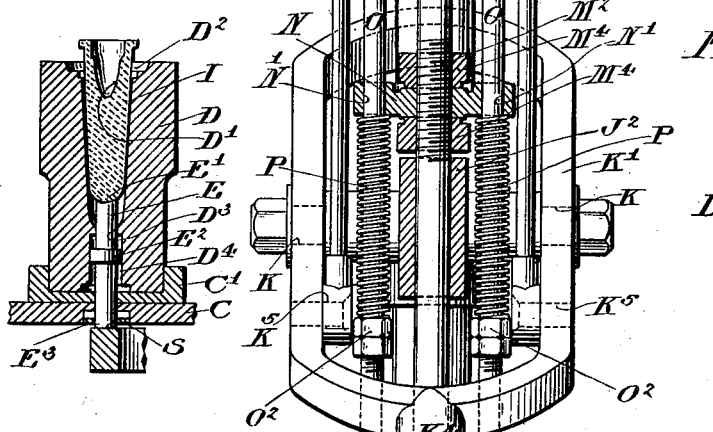
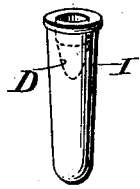
FIG. 4.
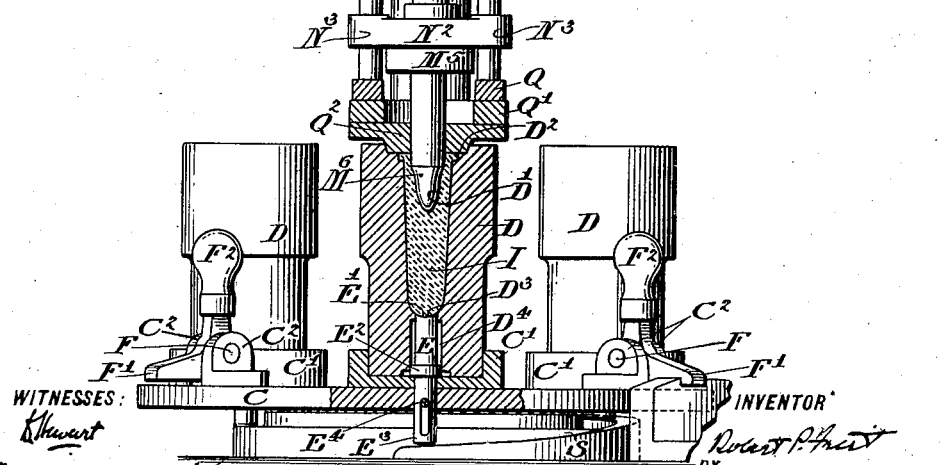
WITNESSES:
INVENTOR
BY
ATTORNEY.
THE NORRIS PETERS CO., WASHINGTON, D. C.

No. 862,466. PATENTED AUG. 6, 1907.
R. P. FRIST.
GLASS MOLDING MACHINE.
APPLICATION FILED DEC. 8, 1904.

3 SHEETS—SHEET 3.

WITNESSES:

INVENTOR

BY

ATTORNEY.

UNITED STATES PATENT OFFICE.

ROBERT P. FRIST, OF BRIDGETON, NEW JERSEY.

GLASS-MOLDING MACHINE.

No. 862,466.   Specification of Letters Patent.   Patented Aug. 6, 1907.

Application filed December 8, 1904. Serial No. 235,960.

*To all whom it may concern:*

Be it known that I, ROBERT P. FRIST, a citizen of the United States of America, residing in Bridgeton, in the county of Cumberland, in the State of New Jersey, have invented a certain new and useful Improvement in Glass-Molding Machines, of which the following is a true and exact description, reference being had to the accompanying drawings, which form a part thereof.

My invention relates to glass molding machines of the kind in which a series of molds are brought successively into coöperative registration with die mechanism by which, either alone, or in co-action with an air blast, a body of glass in the mold is molded to the desired form and condition.
The objects of my invention are, in the first place, to provide automatic mechanism for latching in fixed position each individual mold as it comes successively into coöperative position with the die mechanism, also to so construct the mechanism that the die mechanism may be readily shifted from one side or the other of the table supporting the molds so that the machine can be used either as a right handed or left handed machine, and further, my invention is intended to provide for a simple and automatic ejection of the molded glass from the molds.

Figure 1:
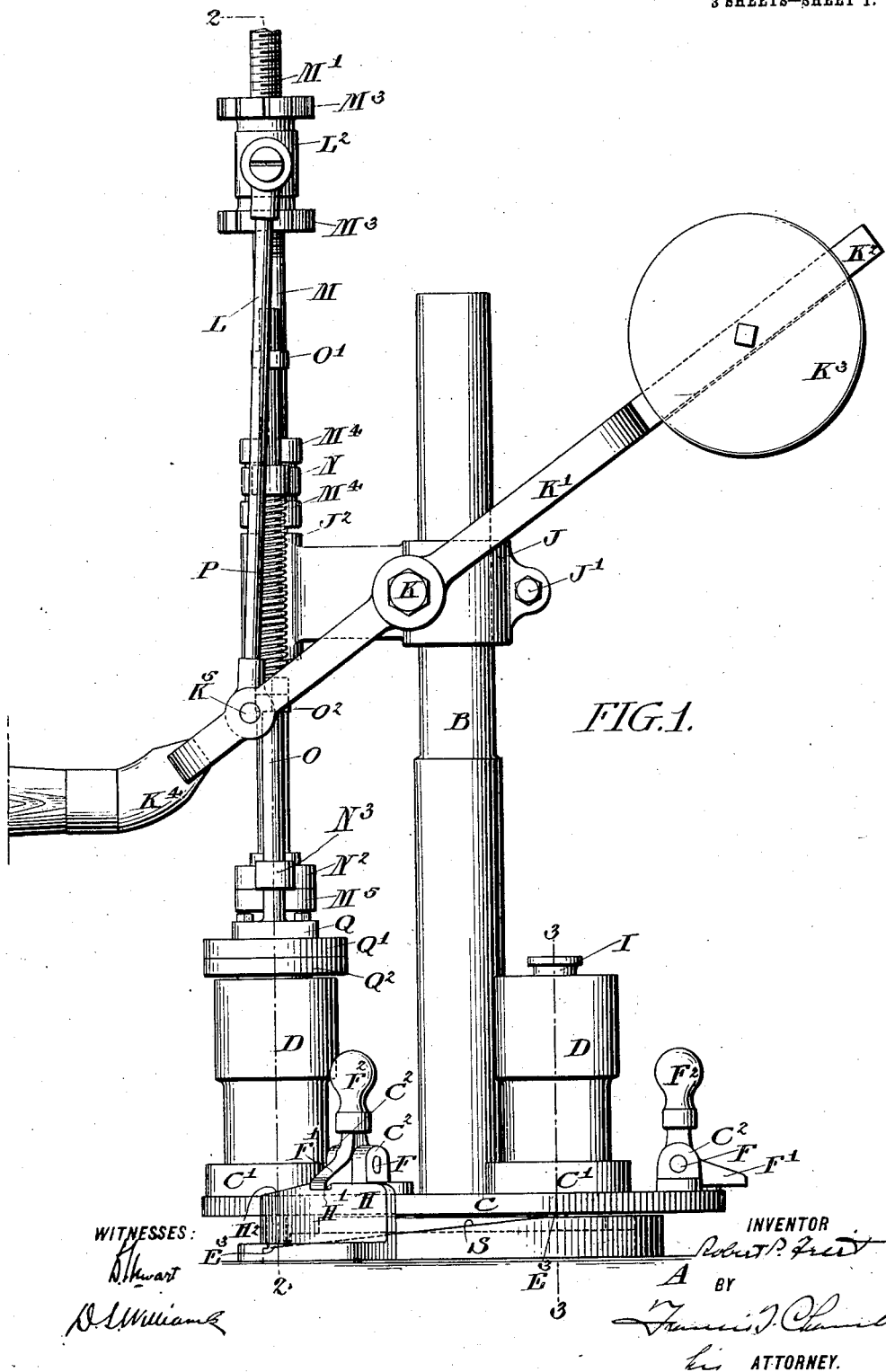
Figure 5:
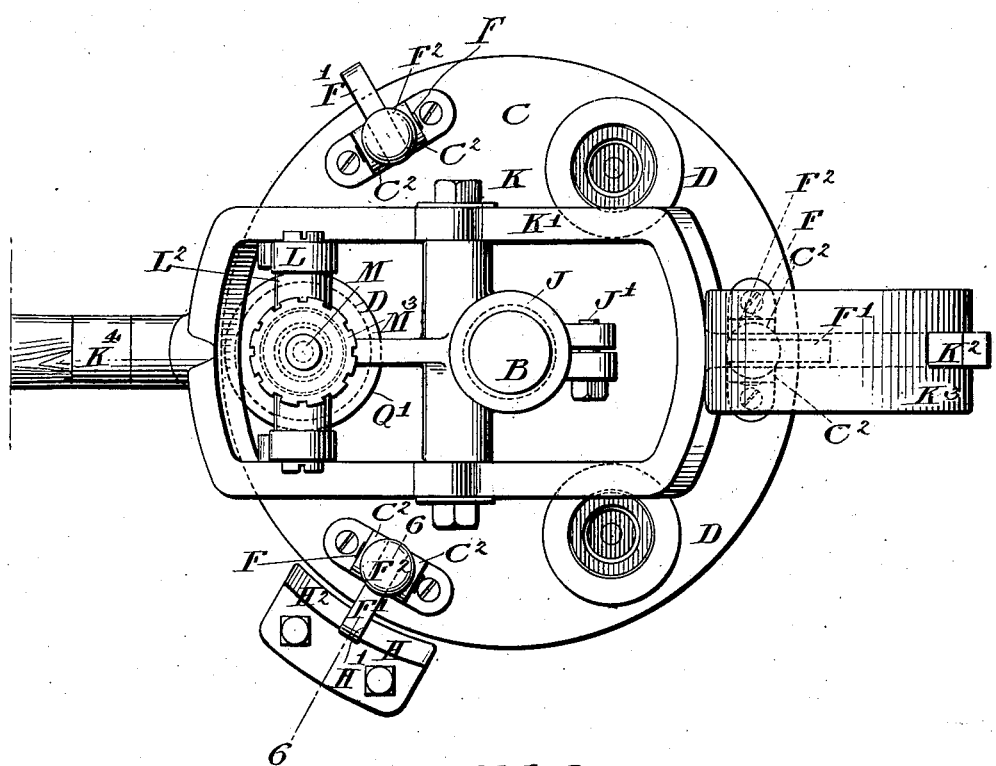

The nature of my improvements by which the above objects are attained will best be understood as described in connection with the drawings in which they are illustrated and in which Figure 1, is a side elevation of a molding machine expressly designed and adapted for the formation of molded blanks of a character adapted to be subsequently utilized for the manufacture of bottles and the like in a blowing machine. Fig. 2, is a front elevation of the machine, shown partly in vertical section, taken as on the line 2—2, of Fig. 1. Fig. 3, is a section through one of the molds and the table and cam underlying the mold, taken as on the section line 3—3, of Fig. 1. Fig. 4, is a perspective view of one of the blanks which the mold and die mechanism shown is adapted to produce. Fig. 5, is a plan view of the machine, and Fig. 6, a view of the latching mechanism shown partly on the section line 6—6, of Fig. 5.

A, indicates the fixed table or frame on which the machine is secured, B, is a standard extending upward from the said table; C, a rotatable table arranged to turn on or around the standard B. This table C, has symmetrically secured to it the series of mold supporting bases $C'$, $C'$, $C'$, and it has also secured to it and extending up from its upper face, the symmetrically disposed lugs $C^2$, $C^2$, etc., and as shown is formed with spring recesses $C^3$, situated between each pair of lugs.

D, D, D, are the molds which, in the special construction shown, are formed slotted with molding recesses $D'$, formed therein, the upper part of these recesses indicated at $D^2$, being adapted to form a shoulder on the molded blank, while the lower part of the mold cavity is recessed, as shown at $D^3$, and the mold below this recess perforated or chambered, as shown at $D^4$.

E, is a plunger working in the perforation and recess of the mold, the upper end $E'$, being adapted, in its lowermost position, as shown in Fig. 2, to form the bottom of the mold cavity. The plunger is formed with a guiding collar or piston $E^2$, fitting in the perforation $D^4$, while the lower end $E^3$, of the plunger, extends down through the table in position to be engaged by the cam to be described. By preference the lower end of the plunger is slotted, as shown in Fig. 2, and a guide pin $E^4$, employed to prevent it from turning.

S, is a cam of curvilinear form placed below the table C, so that the lower end $E^3$, of the plunger E, will engage and ride upon its top surface.

Figure 6:
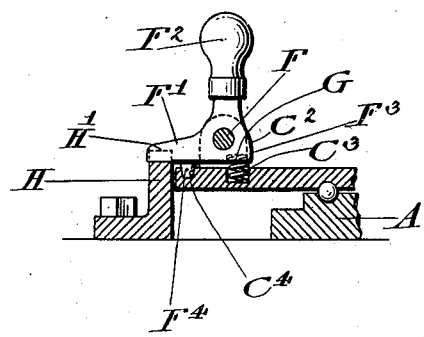

F, F, F, are pivot pins secured in the lugs $C^2$, and supporting the latch levers $F'$, $F'$, $F'$, which latch levers are provided with upwardly extending handles $F^2$, and have their heels situated in the rears of the pivot pins F, as indicated at $F^3$. By preference also the latch levers are provided with guide lugs $F^4$, as shown in Fig. 6, which extend into the cavities $C^4$, of the table.
The latch levers are pressed downward by the action of springs G, see Fig. 6, situated in the spring cavity $C^3$, of the table, and pressing upward against the heels $F^3$, of the latch levers.

H, indicates an upwardly extending rim of metal secured to the fixed table A, and formed with a latched detent $H'$, and a sloping face $H^2$.

I, see Figs. 1, 3 and 4, indicates the molded blank of glass.

J, is a support for the die mechanism secured on the standard B, by a clamping bolt $J'$, and provided with a guideway $J^2$.

K, is a pivot secured on the support J, and to which is pivoted the yoke lever $K'$, having its outer end $K^2$, provided with a counterweight $K^3$, and its inner end $K^4$, provided with a handle for actuating it. Near the inner end the yoke lever supports pivot pins $K^5$, $K^5$, to which are attached the lower ends of the connecting rods L, L, the upper ends of which are connected to pivot pins $L'$, $L'$, of a crosshead $L^2$, which crosshead is adjustably secured to the upper threaded end $M'$, of a rod M, by the clamping nuts $M^3$, $M^3$. The rod M, extends through the guideway $J^2$, and above the said guideway has secured to it a crosshead N, by means of clamping nuts $M^4$, $M^4$. Below the guideway the rod is provided with a collar $M^5$, below which is formed on or attached to the rod the die plunger indicated at $M^6$. The crosshead $N^2$, is secured on the rod M, immediately above the collar $M^5$, as shown, and both the crossheads N, and $N^2$, are provided with guideways indicated at $N'$, $N'$, and $N^3$, $N^3$, through which guideways extend the rods O, O, having collars $O'$, $O'$, secured near their tops, and nut abutments $O^2$, $O^2$, situated between the two crossheads and serving to support the lower ends of springs P, P, the upper ends of which springs rest against the crosshead N, as shown. The lower ends of the rods O, O, are connected through rings $Q'$, $Q'$, with a die plate $Q^2$, the lower surface of which is adapted to fit into collar forming portion $D^2$, of the mold.

The operation of my mechanism may be briefly described as follows. The support J, is clamped to the standard B, in position to have the die supported thereon register accurately with the molds as they come into one of the positions in which they are latched in place and obviously the detachable attachment of the die supporting mechanism will enable the die and its actuating mechanism to be shifted from one side of the table to the other at will so that the machine may work either as a right handed or left handed machine. The table carrying the molds is actuated through the latch lever handles $F^2$, the operator taking hold of the handle of the latch lever, which is engaged in the notch $H'$, pressing it backward to disengage the latch lever and then drawing the table around until the next succeeding latch lever rides over the inclined surface $H^2$, into the latch detent recess $H'$, arresting the next move in operative position with the die mechanism. At the time the die mechanism operates to form the blank I, the plunger E, is in its lowermost position as shown in Fig. 2, and after the die has been retracted the shifting of the table to bring the next mold into operative position carries the plunger end $E^3$, up over the cam surface S, so as to shift the plunger from the position shown in Fig. 2 to that shown in Fig. 3, the plunger in rising lifting the blank out of the mold so that its upper end can be engaged by tongs and the blank removed to the blowing machine.

The operation of the die actuating mechanism is as follows: Normally the counterweight $K^3$, holds the die in its uppermost position and the springs P, P, press the rods O, O, downward, until their collars $O'$, rest on the crosshead N, when a die containing glass to be molded is brought beneath the die the operator presses down the lever $K'$, through the handle $K^4$, and through the connecting rods L, L, and crosshead $L^2$, moves the rod M, downward, and with it the die $M^6$. The rods O, O, also move downward with the rod M, bringing the die plate $Q^2$, into registration with the collar forming portion $D^2$, of the mold where of course it remains stationary, the further downward motion of the rod M, and die $M^6$, simply compressing the springs P, P, while the glass is forced up in the mold around the die plunger and into the shoulder forming recess of the mold. It will readily be seen that if there is any excess of glass in the mold the die portion $Q^2$, is capable of an upward motion under the pressure of the glass which will relieve the machine from injurious strains.

I have already mentioned that the die mechanism may be either a simple molding device, such as is shown in the drawings, or may be provided with a blast nozzle so that air can be introduced through the die to accomplish a portion of the work of forcing the glass into conformation with the mold. I mention this simply that my invention may not be misunderstood as being limited on the use of a die such as is shown in the drawings.

Having now described my invention, what I claim as new, and desire to secure by Letters Patent is,

1. A glass molding machine having in combination a central normally nonrotatable standard, a mold carrying table rotatable around said standard, latches secured on said table adjacent the outer edge thereof corresponding in number and arrangement to the molds also supported on the table, each latch being formed with a detent engaging portion projecting beyond the edge of the table and with a handle for releasing the detent engaging portion from the detent and for rotating the table, a fixed latch detent arranged adjacent the edge of the table to engage each latch in turn as the table revolves, so as to arrest each mold in turn in position to coact with the die mechanism, and die mechanism arranged to coact with the molds in molding the glass therein.

2. A glass molding machine having in combination a central normally non-rotatable standard, a mold carrying table rotatable around said standard, latches secured on the table corresponding in number and arrangement to the molds also supported on the table, and provided with handles for releasing them from the detent, a fixed latch detent arranged to engage each latch in turn as the table revolves so as to arrest each mold in turn in position to coact with the die mechanism, and die mechanism arranged to coact with the molds in molding the glass therein, said die mechanism being attached to the central standard by clamping mechanism which permits it to be shifted from one side to the other of said standard.

ROBERT P. FRIST.

Witnesses:
ARNOLD KATZ,
D. STEWART.